United States Patent
Tatsuno

(10) Patent No.: US 9,167,122 B2
(45) Date of Patent: Oct. 20, 2015

(54) IMAGE READING DEVICE AND IMAGE FORMING DEVICE

(71) Applicant: Hibiki Tatsuno, Kawasaki (JP)

(72) Inventor: Hibiki Tatsuno, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/490,092

(22) Filed: Sep. 18, 2014

(65) Prior Publication Data

US 2015/0002912 A1    Jan. 1, 2015

Related U.S. Application Data

(63) Continuation of application No. 12/230,695, filed on Sep. 3, 2008, now Pat. No. 8,867,108.

(30) Foreign Application Priority Data

Sep. 4, 2007 (JP) .................................. 2007-228756

(51) Int. Cl.
| | | |
|---|---|---|
| H04N 1/028 | (2006.01) | |
| F21K 99/00 | (2010.01) | |
| H04N 1/10 | (2006.01) | |
| H04N 1/193 | (2006.01) | |
| F21Y 101/02 | (2006.01) | |

(52) U.S. Cl.
CPC .............. *H04N 1/02815* (2013.01); *F21K 9/58* (2013.01); *H04N 1/0284* (2013.01); *H04N 1/02885* (2013.01); *F21Y 2101/02* (2013.01); *H04N 1/1013* (2013.01); *H04N 1/193* (2013.01)

(58) Field of Classification Search
USPC .................................. 358/471, 474; 362/235
See application file for complete search history.

(56) References Cited

U.S. PATENT DOCUMENTS

| | | | |
|---|---|---|---|
| 3,942,873 A | 3/1976 | Shimotakahara | |
| 4,473,865 A | 9/1984 | Landa | |
| 4,920,431 A | 4/1990 | Ogura et al. | |
| 4,985,617 A | 1/1991 | Ogushi | |
| 5,019,918 A | 5/1991 | Kubota et al. | |
| 5,101,285 A * | 3/1992 | Kawai et al. ................... | 358/471 |
| 5,810,463 A * | 9/1998 | Kawahara et al. ............ | 362/601 |
| 6,496,285 B1 | 12/2002 | Fujimoto et al. | |
| 7,158,738 B2 * | 1/2007 | Nakashige .................... | 399/221 |
| 2002/0154290 A1 | 10/2002 | Tompkin et al. | |
| 2005/0111115 A1 | 5/2005 | Tatsuno et al. | |
| 2005/0195452 A1 | 9/2005 | Tatsuno | |
| 2006/0007417 A1 | 1/2006 | Tatsuno | |
| 2007/0229942 A1 | 10/2007 | Horie et al. | |
| 2008/0049207 A1 | 2/2008 | Tatsuno | |
| 2008/0062478 A1 | 3/2008 | Tatsuno | |
| 2008/0218724 A1 | 9/2008 | Nishina et al. | |

FOREIGN PATENT DOCUMENTS

| | | |
|---|---|---|
| JP | 58-123563 | 7/1983 |
| JP | 4-40352 | 4/1992 |

(Continued)

*Primary Examiner* — Allen H Nguyen
(74) *Attorney, Agent, or Firm* — Dickstein Shapiro LLP

(57) ABSTRACT

An image reading device, includes an illumination optical system which has a light source unit configured to emit light being illuminating light to an illuminated object; an optical member configured to have a plurality of reflecting plates and collect the light emitted from the light source unit; and a plurality of reflecting members, the light emitted from the light source unit being collected by the optical member, and the collected light being reflected by the plurality of reflecting members to illuminate a reading target area on the illuminated object, and at least one reflecting surface of the optical member or the plurality of reflecting members having a relief structure.

18 Claims, 9 Drawing Sheets

(56) References Cited

FOREIGN PATENT DOCUMENTS

| | | |
|---|---|---|
| JP | 10-322521 | 12/1998 |
| JP | 2002-142082 | 5/2002 |
| JP | 2004-021172 A | 1/2004 |
| JP | 2005-241681 | 9/2005 |
| JP | 2005-311662 | 11/2005 |
| JP | 2006-42016 | 2/2006 |
| JP | 2006-67551 | 3/2006 |
| JP | 2006-245955 | 9/2006 |

* cited by examiner

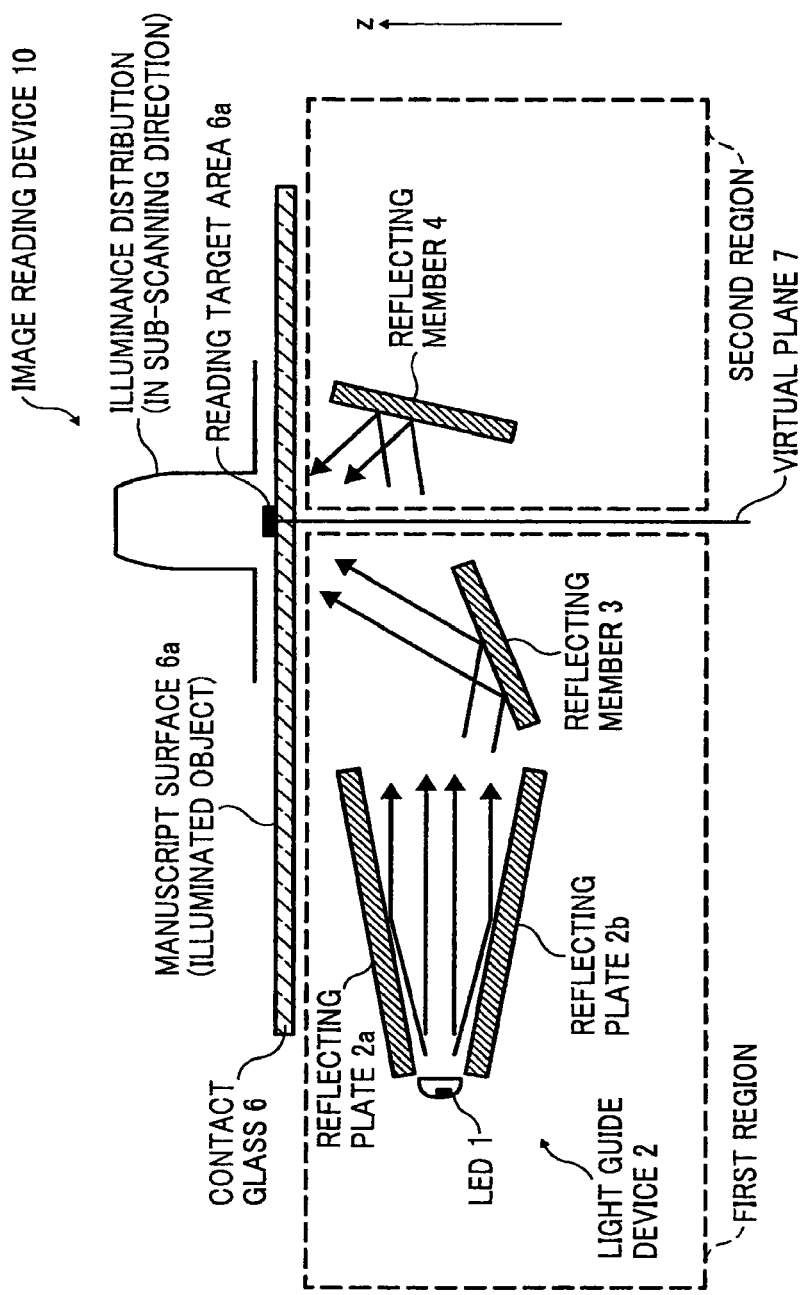

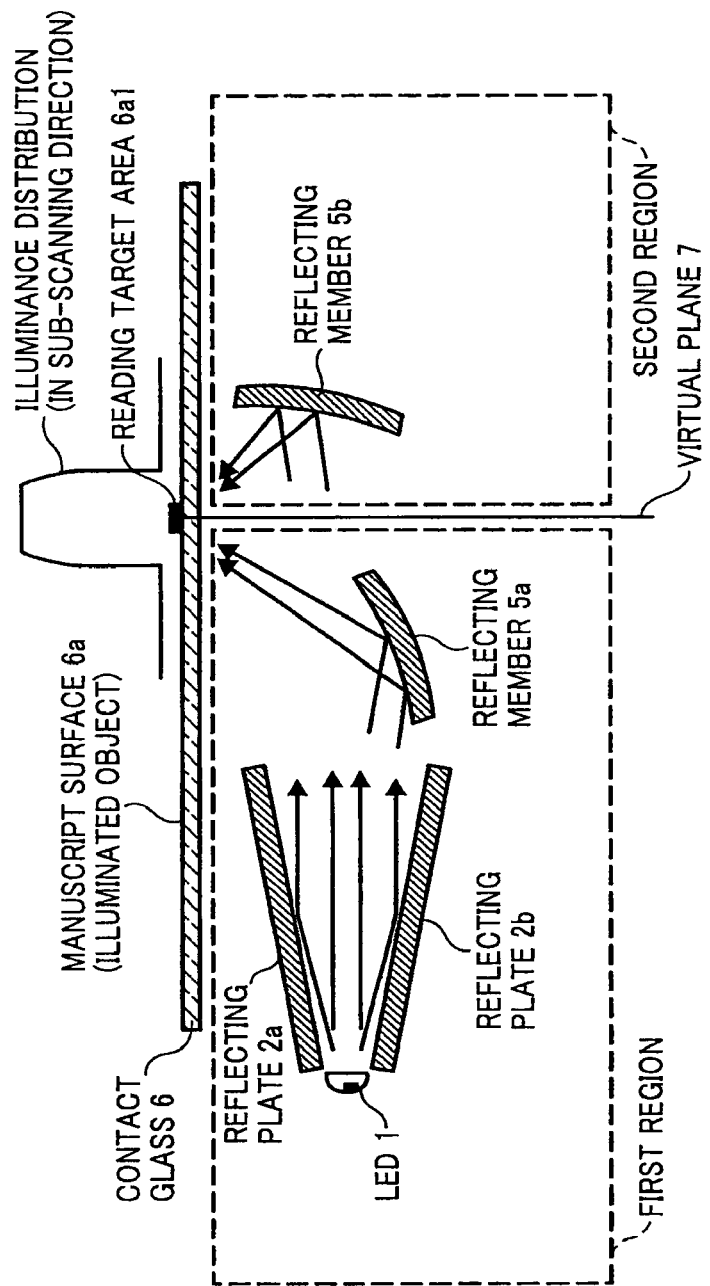

IMAGE READING DEVICE AND IMAGE FORMING DEVICE

This application is a continuation of U.S. patent application Ser. No. 12/230,695, filed Sep. 3, 2008, which is based on and claims priority from Japanese Patent Application No. 2007-228756, filed Sep. 4, 2007, the disclosures of which are hereby incorporated by reference herein in their entireties.

BACKGROUND OF THE INVENTION

1. Field of the Invention

The present invention relates to an image reading device which is used in such as a digital copy machine or an image scanner, and an image forming device including the image reading device.

2. Description of the Related Art

In recent years, the development of the light emitting diode (LED) has been carried out actively, and brightness of LED elements has risen rapidly. Generally, advantages of LED are, for example, long life, high efficiency, high anti-acceleration character and monochrome luminescence, etc., and numerous applications of LED in the field of illumination are expected.

As an application, LED is used as a manuscript illuminating device of an image reading device such as a digital copy machine or an image scanner.

Various methods are proposed for the application of LED which is employed by the image reading device. For example, JP 2006-67551A, JP 2006-42016A, JP 2005-241681A disclose that a plurality of LEDs are lined up in parallel with a main-scanning direction of a manuscript, and light emitted from the plurality of LEDs is diffused without giving any optical effect in the main-scanning direction, and the light is collected by reflecting surfaces in a sub-scanning direction, thus illuminance on a reading target area on a manuscript surface is heightened. Further, JP 2005-311662A discloses that a plurality of LEDs are lined up in parallel with a main-scanning direction of a manuscript, and light emitted from the plurality of LEDs is diffused without giving any optical effect in the main-scanning direction, and the light is collected by a lens in a sub-scanning direction, thus illuminance on a reading target area on a manuscript surface is heightened.

Here, the desired kind of illuminance or illuminance distribution on the manuscript surface will be explained.

As illustrated in FIG. 1, in an image reading device used in a digital copy machine or an image scanner, information included in a manuscript is input into an imaging device such as CCD through a readout lens. FIG. 2 is a top view of a manuscript surface illustrated in FIG. 1 viewed from the above. The image reading device is in a state such that only information of a long and thin reading target area illustrated in FIG. 2 is capable of being input into the imaging device, when an optical system is in a fixed state. Then, by moving the entire device illustrated in FIG. 1, or moving an illumination optical system in conjunction with reflecting mirrors, the reading target area is moved in a direction of an arrow in FIG. 2. The entire manuscript can be read out by inputting information into the imaging device sequentially while moving the reading target area.

At this time, the amount of light entering the imaging device per unit time is required to be increased to move the reading target area illustrated in FIG. 2 at a high speed (to shorten reading time per one sheet of the manuscript), and a high illuminance to the manuscript surface is preferable. From this viewpoint, the methods of restricting light in the sub-scanning direction disclosed in the above-mentioned patent documents are appropriate.

Meanwhile, uniform illuminance distribution is preferable in general. FIG. 3 illustrates a conjugate relationship of the manuscript surface and the imaging device, and an example of the illuminance distribution on the manuscript surface is illustrated by a solid line and a dotted line. The solid line in the figure represents an illuminance distribution on the manuscript surface at a predetermined point, and the dotted line represents a changed illuminance distribution by such as an influence of a vibration from outside at a predetermined moment. As illustrated by the solid line or the dotted line in FIG. 3, when there is unevenness in the illuminance distribution on the manuscript surface, illuminance at a position on an imaging surface corresponding to a position on the manuscript surface where the illuminance is high, is high as well, and vice versa. During moving the reading target area in the direction of the arrow illustrated in FIG. 2 and reading the entire manuscript, if a relationship of the manuscript and the illumination is always the same, illuminance distribution with such unevenness can be corrected by an image data processing. However, unevenness in density is generated in a scanned image if the relationship of the manuscript and the illumination is changed from a state illustrated by the solid line to a state illustrated by the dotted line instantaneously during this period, and a quality of the image decreases.

Therefore, as illustrated in FIG. 4, in general, it is preferable that the illuminance distribution over the entire reading target area be uniform. Illuminance distribution on the imaging surface would not change even if a positional relationship of the manuscript and the illumination shifts, for example, by receiving a vibration from the outside, if the illuminance distribution is uniform.

In any method disclosed in the above-mentioned documents, to make the illuminance distribution in the main-scanning direction uniform, light from a point light source, namely an LED, is diffused directly without giving any optical action to the light. However, when such a method is adopted, a long distance is necessary from the light source to the manuscript surface when the number of light source is small, and there is a possibility that an illumination optical system from the light source to the manuscript surface gets larger. When increasing the number of light sources to miniaturize the illumination optical system, though the illuminance is improved and the illumination optical system can be further miniaturized, there are disadvantages such as a high cost and high power consumption.

SUMMARY OF THE INVENTION

At least an object of the present invention is to provide an image reading device with good illuminance distribution which includes a compact illumination optical system having few light sources. At least another object of the present invention is to provide an image forming device including the image reading device.

In light of the above, the present invention proposes, for example, an image reading device including an illumination optical system which has: a light source unit configured to emit light being illuminating light to an illuminated object; an optical member configured to have a plurality of reflecting surfaces and collect the light emitted from the light source unit; and a plurality of reflecting members. The light emitted from the light source unit is collected by the optical member, and the collected light is reflected by the plurality of reflecting members to illuminate a reading target area on the illuminated object, and at least one reflecting surface of the optical member or the plurality of reflecting members has a relief structure, which reflects incident light while diffusing the incident light.

In addition, the present invention proposes an image forming device including the image reading device described herein.

BRIEF DESCRIPTION OF THE DRAWINGS

The invention will be described further below with reference to embodiments and the accompanying schematic drawings, in which:

FIG. 5A is a cross-sectional view illustrating a main part of an image reading device according to a first embodiment of the present invention.

FIG. 10A is a cross-sectional view illustrating a main part of an image reading device according to a fourth embodiment of the present invention.

DETAILED DESCRIPTION OF THE PREFERRED EMBODIMENTS

In the present invention, a traveling direction of diffusion light emitted from a point light source is distributed irregularly (randomly) by a relief structure provided on a reflecting surface. A constitution of an image reading device according to the present invention will be explained.

Embodiment 1

Figure 1:
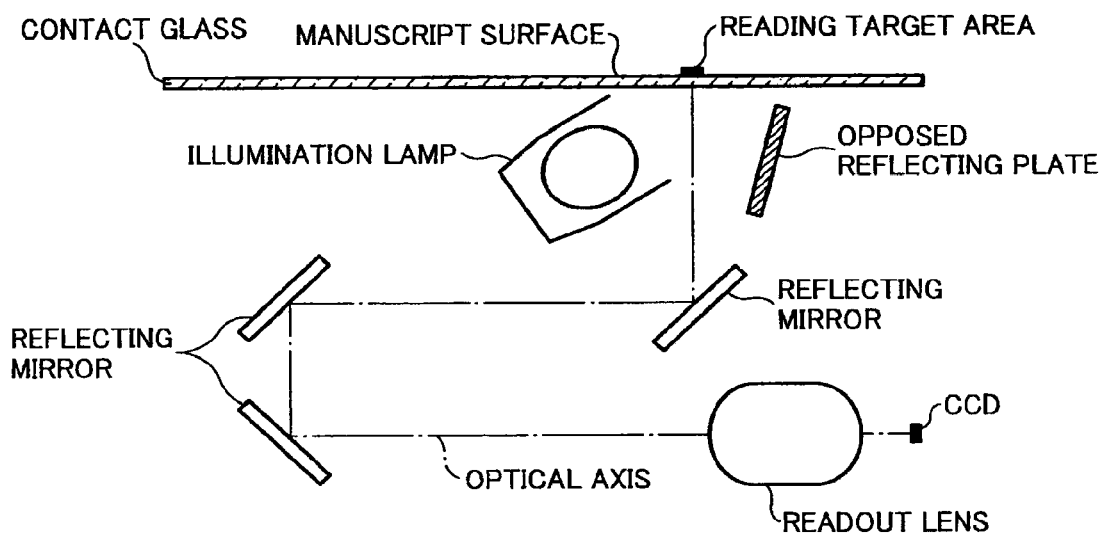
FIG. 1 is a sectional view illustrating a constitution of a conventional image reading device.
Figure 2:
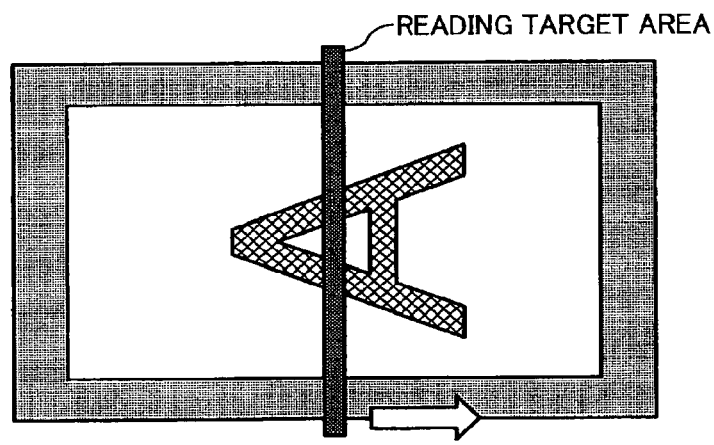
FIG. 2 is an explanatory drawing explaining a reading target area on an illuminated object surface (a manuscript surface)
Figure 3:
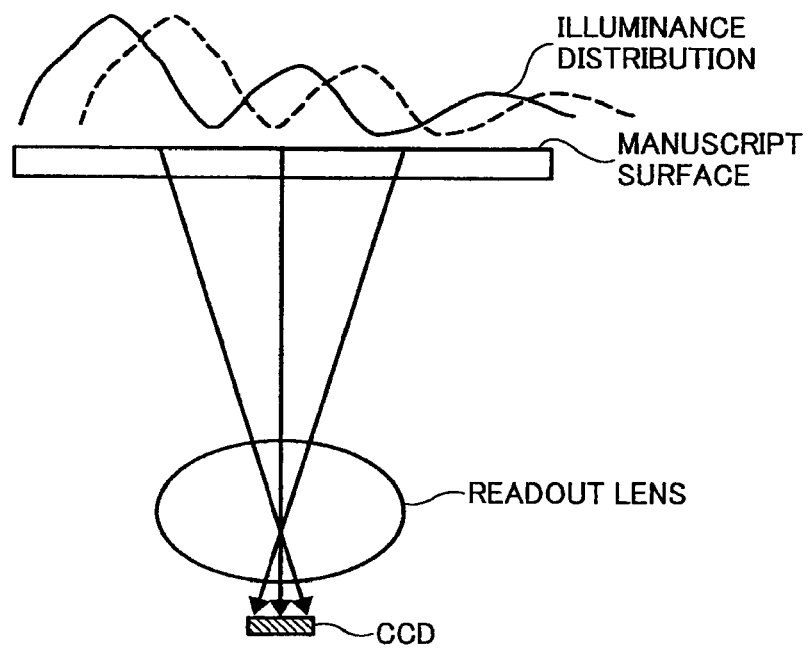
FIG. 3 is an explanatory drawing explaining a reading state in a CCD when illuminance distribution is not uniform.
Figure 4:
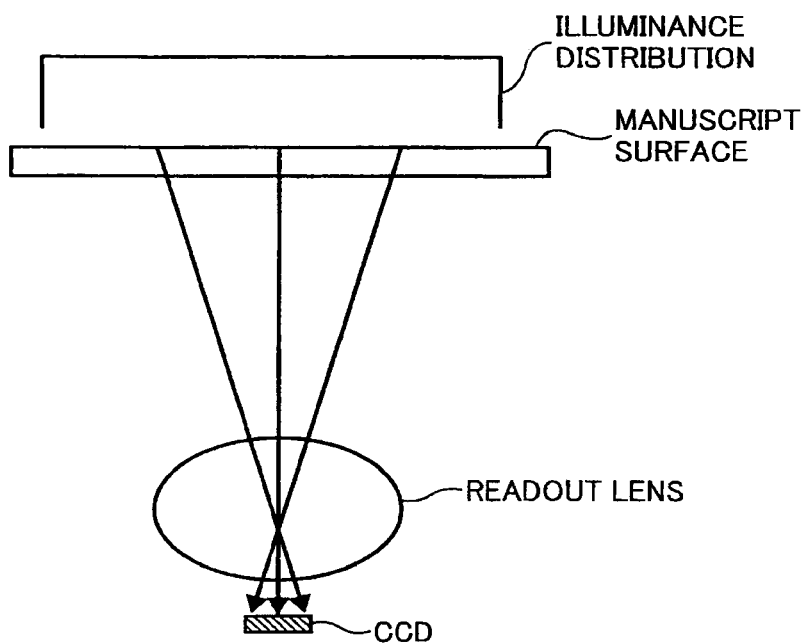
FIG. 4 is an explanatory drawing explaining a reading state in the CCD when the illuminance distribution is uniform.
Figure 5B:
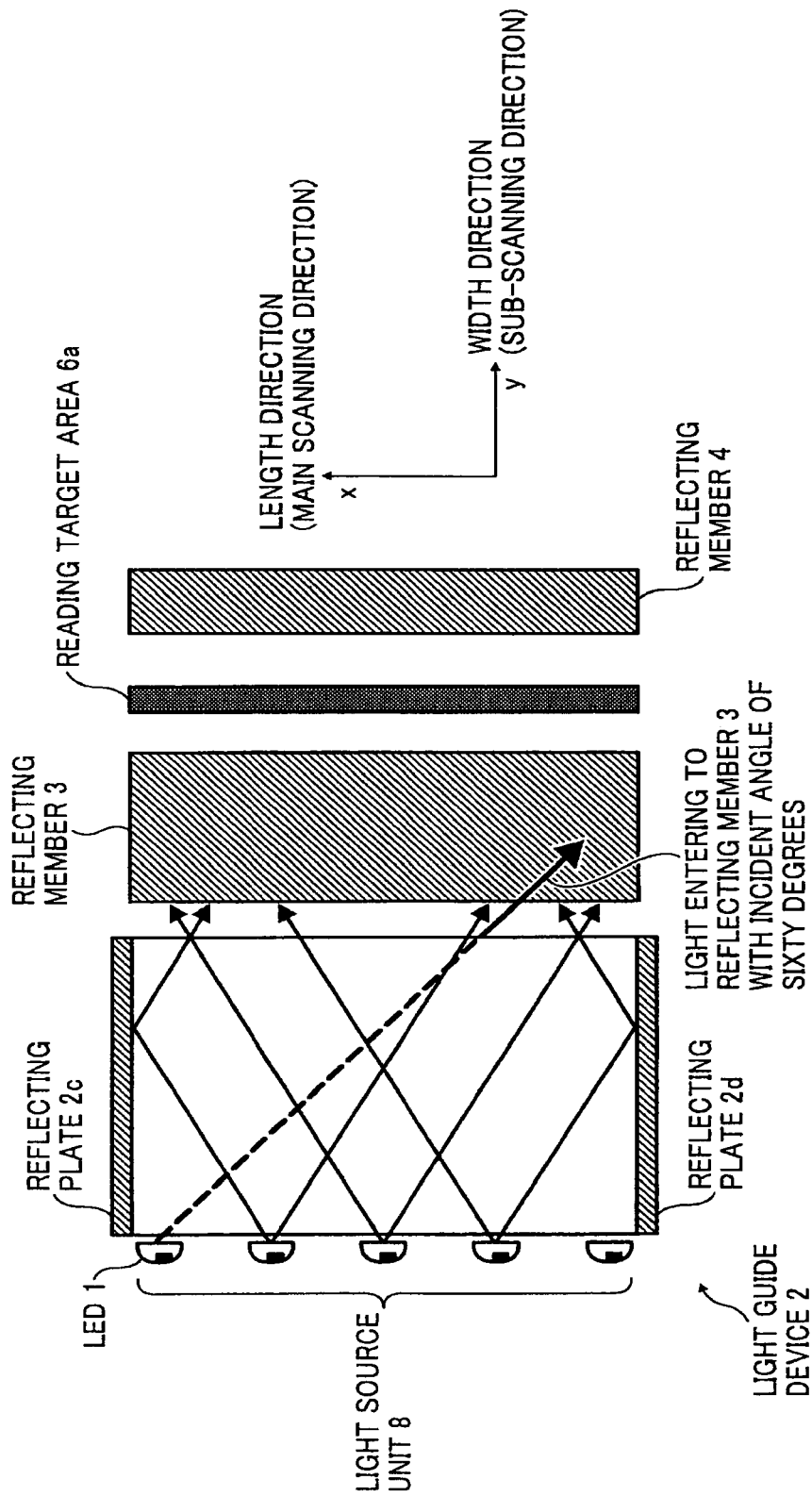
FIG. 5B is a top cross-sectional view illustrating the main part of the image reading device according to the first embodiment of the present invention.

FIG. 5A is a cross-sectional view illustrating a main part of the image reading device according to the first embodiment of the present invention, and FIG. 5B is a top cross-sectional view illustrating the main part of the image reading device according to the first embodiment of the present invention.

As illustrated in FIGS. 5A and 5B, an image reading device 10 includes an illumination optical system including: a light source unit 8 which has one LED 1 (a point light source) or a plurality of LEDs 1 arranged in rows as a light emitting device and a light source which emits light as illuminating light to an illuminated object (a manuscript surface in the present invention); a light guide device 2 which is an optical member having a plurality of reflecting plates 2a, 2b, 2c, 2d and having a function of collecting light; and reflecting members 3, 4. The image reading device 10 further includes a contact glass 6 which has a manuscript surface 6a; an imaging optical system (not illustrated) which is configured to image light reflected from a reading target area 6a1 arranged on the manuscript surface 6a; and a sensor (not illustrated) which is arranged at an imaging part of the imaging optical system and reads out an image of the manuscript. In addition, the contact glass 6 includes a first and a second planes each of which has an XY plane, and the first plane, which is not facing the illumination optical system, is the manuscript surface 6a (an illuminated surface) where the manuscript is disposed. The reading target area 6a1 arranged on the manuscript surface 6a has a predetermined length and a predetermined width, and the manuscript is disposed on the reading target area 6a1. Here, light emitted from the light source unit 8 is collected by the light guide device 2, and the collected light is reflected by the reflecting members 3 and 4 respectively, and then the light transmits through the contact glass 6 and irradiates the manuscript on the manuscript surface 6a, for details the reading target area 6a1 on the manuscript surface 6a, which has the predetermined length and the predetermined width.

Moreover, a space under the contact glass 6 where the illumination optical system is disposed is divided into two divisions: a first region in which the light source unit 8 exists and a second region in which the light source 8 does not exist, by a virtual plane 7. Here, the virtual plane 7 represents a plane that separates the manuscript surface 6a vertically and passes through the reading target area 6a1, i.e. a plane through which light reflected from the manuscript (the reading target area 6a1) and used for an image formation passes. The light source unit 8, the light guide device 2, and the reflecting member 3 are arranged in the first region, and the reflecting member 4 is arranged in the second region. Since the light emitted from the light source unit 8 is reflected by the reflecting member 3 and the reflecting member 4 respectively, and then enters into the reading target area 6a1 on the manuscript surface 6a, the illumination light is irradiated from both sides of the virtual plane 7 across the virtual plane 7, and a uniform illuminance distribution in a sub-scanning direction can be obtained.

In FIG. 5, a length direction of the reading target area 6a1 (a main-scanning direction, an up and down direction in FIG. 5B) is set as an X direction; a width direction of the reading target area 6a1 (the sub-scanning direction, a right and left direction in FIG. 5B) is set as a Y direction, and a direction (an up and down direction in FIG. 5A) through which the light used for the image formation of the reflected light from the reading target area 6a1 passes is set as a Z direction. In addition, in the following embodiments, relationships between the virtual plane 7 and the first region and the second region are defined similar to those in the present embodiment. In particular, except for changes such as the type of an optical member, the arrangements and constitutions of the virtual plane 7 and the first region and the second region are similar to those in the present embodiment.

Moreover, the LED 1 is the point light source which emits white light. For example, a single-chip type white light-emitting diode which uses a fluorescent material, or a white light-emitting diode which consists of at least two kinds of chips of a light-emitting diode each of which emits a different color of light, and which emits white light by the color mixture, is preferable.

The light guide device 2 includes a plurality of reflecting plates 2a, 2b, 2c, and 2d which are integrated. Each of reflecting surfaces of the reflecting plates 2a, 2b, 2c, and 2d can be a flat surface, or curved surface. Moreover, each of the reflecting surfaces can be provided with an aluminum coating or a reflective sheet, to improve the reflection efficiency.

The reflecting plates 2a and 2b are arranged such that they sandwich the light emitted from the light source unit 8 in the Z direction, and as illustrated in FIG. 5A, the reflecting plates 2a and 2b are disposed with an angle such that from an entry side to an exit side of the light guide device 2, an interval between the reflecting plates 2a and 2b increases. Thus, light that diffuses outside in the Z direction from a front direction of the light source unit 8 (LED1), which is a part of the light emitted from the light source unit 8 (LED1), can be reflected by the reflecting plates 2a and 2b and be collected in the front direction of the light source unit 8. In addition, the reflecting plates 2c and 2d are arranged such that they sandwich the light emitted from the light source unit 8 in the X direction and are disposed in parallel. Thus, light that diffuses outside in the X direction from the front direction of the light source unit 8 (LED1), which is a part of the light emitted from the light source unit 8 (LED1), can be reflected by the reflecting plates 2c and 2d and be used to illuminate the manuscript effectively. Thus, the light emitted from the light source unit 8 is collected by the light guided device 2 and enters the reflecting members 3 and 4.

For example, the reflecting plates 2a, 2b, 2c, and 2d can be integrated by adhering with an adhesive, or formed and shaped integrally, or be integrated by combining two pairs of moldings.

Each of the reflecting plate 3 and the reflecting plate 4 reflects the light collected by the light guide device 2 and directs the light to the reading target area 6a1 on the manuscript surface 6a. That is to say, in the first region the light from the light guide device 2 is reflected by the reflecting plate 3 and is directed to the reading target area 6a1 on the manuscript surface 6a, and in the second region the light from the light guide device 2 is reflected by the reflecting plate 4 and is directed to the reading target area 6a1 on the manuscript surface 6a.

Each of the reflecting surfaces of the reflecting members 3 and 4 is a flat surface, and to improve the reflection efficiency, each of the reflecting surfaces is aluminum coated or provided with a reflective sheet.

Figure 6A:
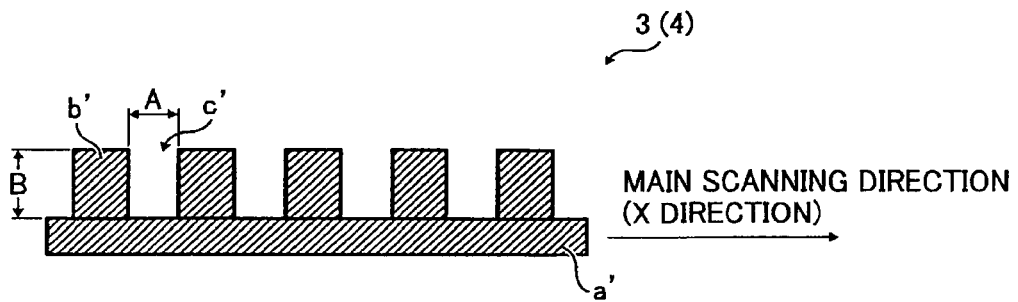
FIGS. 6A and 6B are sectional views illustrating a relief structure formed on a reflecting surface of a reflecting member illustrated in FIGS. 5A and 5B according to the first embodiment of the present invention.
Figure 6B:
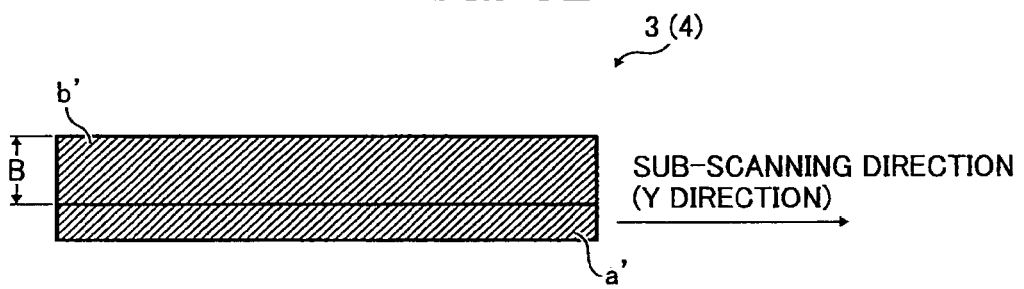

Moreover, a fine relief structure for reflecting while scattering the incident light, is formed on the reflecting surfaces of the reflecting members 3 and 4. FIGS. 6A and 6B illustrate enlarged sectional views of the relief structure formed on the reflecting surfaces of the reflecting members 3 and 4. FIG. 6A is a sectional view of the reflecting member 3 (or 4) cut in the main-scanning direction (the X direction), and FIG. 6B is a sectional view of the reflecting member 3 (or 4) cut in the sub-scanning direction (the Y direction). Hereafter, the relief structure of the reflecting member 3 will be explained, and the reflecting member 4 is formed with a similar relief structure.

The relief structure of the reflecting member 3 includes a one-dimensional grating (a grating structure) in which a plurality of rectangular grooves (concave portions) c' are formed in parallel on a substrate a'. The plurality of grooves (concave portions) c' are arranged such that a length direction of each of the grooves c' is perpendicular to the X direction, which is a length direction of the reading target area 6a1, therefore, a cross section of the plurality of grooves (the concave portions) c' in the X direction is a structure of a plurality of rectangular convex portions b' lined up at a regular interval (a width of one groove (one concave portion) c'), as illustrated in FIG. 6A. On the other hand, a cross-section of the plurality of grooves (the concave portions) c' in the sub-scanning direction (the Y direction) is a structure of a plane with a height of B of the convex portion b' formed continuously on the substrate a', as illustrated in FIG. 6B. It is necessary to suitably select such as a size of an asperity, an incident angle of light, and a reflecting angle of light, to avoid reflecting light of a specific wavelength only, though it is desirable that such a relief structure has a diffraction grating structure. Such a relief structure is formed by a well-known method such as the pattern etching by the photoresist.

Figure 7:
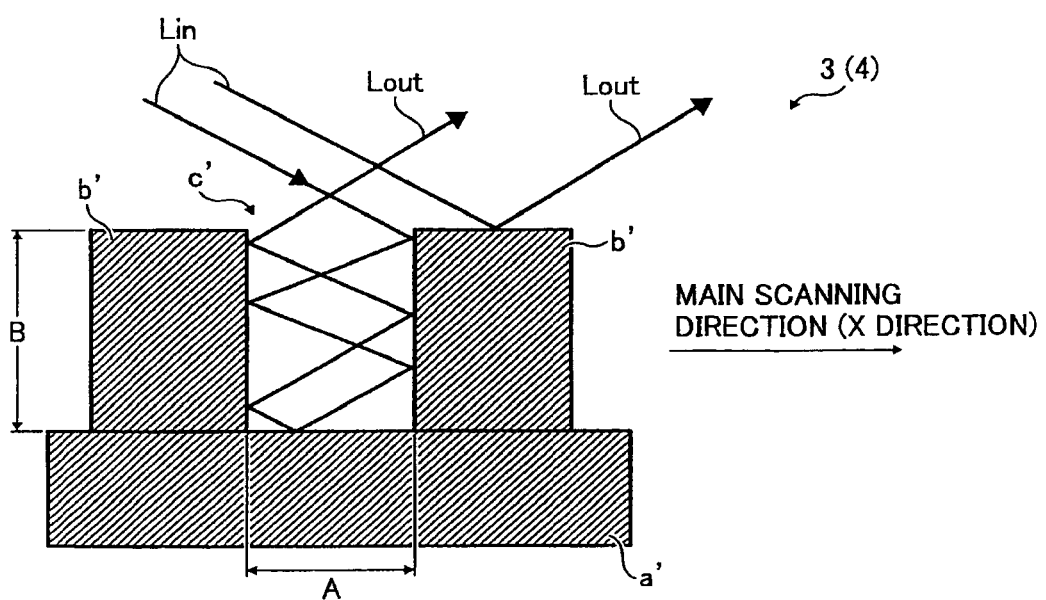
FIG. 7 is a sectional view illustrating a reflection mechanism on the reflecting surface illustrated in FIGS. 6A and 6B according to the first embodiment of the present invention.

FIG. 7 illustrates the incidence of light to the reflecting member 3 (or 4) having the relief structure illustrated in FIGS. 6A and 6B, and reflection of the light thereof. Lines with arrows in the figure are light rays (incident light Lin and reflected light Lout).

First of all, the incident light Lin to a top surface of the convex portion b' is reflected to a direction line-symmetric to a perpendicular line of the cross-section in the figure (a specular reflection) and advances as the reflected light Lout. On the other hand, light that has entered the concave portion c' is reflected plural times in the concave portion c' as illustrated in FIG. 7, and then is emitted in a random direction which has a different angle with the light reflected by the top surface of the convex portion b'. Due to a part of reflected light from the reflecting surfaces advancing in a random direction on the cross-section in the figure, thus it can obtain an uniform illuminance distribution in the length direction of the reading target area 6a1 (the main-scanning direction), even if the interval of the LEDs 1 is constant. It is preferable that if the relief structure be a diffraction grating since a diffusion degree by the reflection rises further, here, for example, only the diffusion effect by the reflection which can be expressed by the Snell's law will be explained.

There is no advantage in providing the relief structure if there are too few reflection frequencies in the concave portion c', therefore it is preferable that there be a large number of reflection frequencies. However, a problem arises in that energy attenuates after the reflection. The illuminance on the reading target area 6a1 decreases remarkably when it is a structure in which reflection occurs too many times. For example, if each of the reflecting surfaces of the reflecting members 3 and 4 is formed with an aluminum thin film, since a degree of reflection of aluminum is almost 90% at each incident angle of light, energy of the light will be reduced to 90% after one time of reflection, to 81% after two times, 73% after three times, and finally 48%, lower than 50%, after seven times of reflection.

Consequently, it is preferable to set a ratio (B/A) of the height B of the convex portion b' to the width A of the concave portion c' of the relief structure to 0.692 or more than 0.692. As a result, the reflection frequency of light becomes less than seven times, and a remarkable decrease of illuminance and a reduction of the contribution to illumination of light that enters into the reading target area 6a1 from a random direction can be avoided. Here, the above-mentioned ratio is set on a basis such that an emitting angle of light emitted from the LED 1 is within a half-value angle with respect to the front direction of the LED.

Here, the half-value angle will be explained.

Usually, the light intensity of light, emitted at a light emitting angle of sixty degrees from an LED (a bare chip type LED) which is not provided with a refraction member such as a lens, to its light emitting device (chip) has 50% energy of that of light emitted in the front direction of the LED. An angle at which light having 50% energy of that of light emitted in the front direction of the LED is emitted is called a "half-value angle". For example, as illustrated in FIG. 5B, the light intensity of light entering to the reflecting member 3 with an incident angle of sixty degrees from the LED 1 which is represented by a heavy line has 50% energy of that of light emitted from the LED 1 in the front direction (the right direction in the figure), thus the half-value angle is sixty degrees. In this invention, the light energy of light emitted from such a general bare chip type LED at a half-value angle is restricted to be not less than 50% energy of that after reflection.

Embodiment 2

Figure 8:
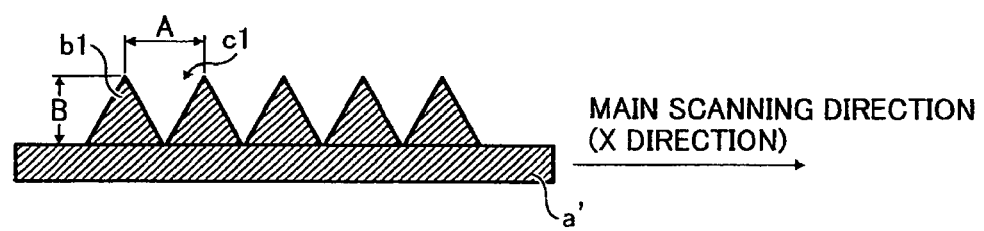
FIG. 8 is a sectional view illustrating a relief structure formed on the reflecting surface of the reflecting member of the image reading device according to a second embodiment of the present invention.

In the second embodiment, the constitutions of the LED 1 or the LEDs 1 and the light guide device 2, and the arrangement of the reflecting members 3 and 4 are similar to those in the first embodiment (similar constitution as illustrated in FIG. 5), and as illustrated in FIG. 8, a relief structure on each of the reflecting surfaces of the reflecting members 3 and 4 is formed in a shape of triangle. That is, the relief structure of the reflecting member 3 (or 4) includes a one-dimensional grating (a grating structure) in which a plurality of inverted triangular grooves (concave portions) c1 are formed on the substrate a' in parallel. Hereat, the plurality of grooves (concave portions) c1 are arranged such that a length direction of each of the grooves (concave portions) c1 is perpendicular to the X direction which is the length direction of the reading target area 6a1; therefore, a cross-section of the plurality of grooves (concave portions) c1 in the X direction is a structure of a plurality of triangular convex portions b1 lined up in a row, as illustrated in FIG. 8. On the other hand, a cross section of the plurality of grooves (concave portions) c1 in the sub-scanning direction (the Y direction) is a structure of a plane with a height of B of the convex portion b1 formed continuously on the substrate a'.

In addition, in the second embodiment, if a ratio (B/A) of the height B of the convex portion b1 to the width A of the concave portion c1 of the relief structure is set to 0.692 or more than 0.692, a uniform illuminance distribution and predetermined illuminance can be obtained, without the reflection frequency of light emitted at the half-value angle, i.e., sixty degrees, exceeding seven times.

Embodiment 3

Figure 9:
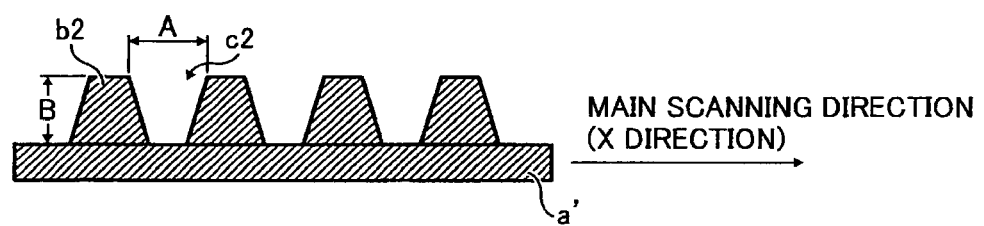
FIG. 9 is a sectional view illustrating a relief structure formed on the reflecting surface of the reflecting member of the image reading device according to a third embodiment of the present invention.

In the third embodiment, the constitutions of the LED 1 or the LEDs 1 and the light guide device 2, and the arrangement of the reflecting members 3 and 4 are similar to those in the first embodiment (similar constitution as illustrated in FIG. 5), and as illustrated in FIG. 9, a relief structure on each of the reflecting surfaces of the reflecting members 3 and 4 is formed in a trapezoidal shape. That is, the relief structure of the reflecting member 3 (or 4) includes a one-dimensional grating (a grating structure) in which a plurality of inverted trapezoidal grooves (concave portions) c2 are formed on the substrate a' in parallel. Hereat, the plurality of grooves (concave portions) c2 are arranged such that a length direction of each of the grooves c2 is perpendicular to the X direction, which is the length direction of the reading target area 6a1; therefore, a cross-section of the plurality of grooves (concave portions) c2 in the X direction is a structure of a plurality of trapezoidal convex portions b2 lined up at a regular interval, as illustrated in FIG. 9. On the other hand, a cross-section of the plurality of grooves (the concave portions) c2 in the sub-scanning direction (the Y direction) is a structure of a plane with a height of B of the convex portion b2 formed continuously on the substrate a'.

In addition, in the third embodiment, if a ratio (B/A) of the height B of the convex portion b2 to the width A of the concave portion c2 of the relief structure is set to 0.692 or more than 0.692, a uniform illuminance distribution and predetermined illuminance can be obtained, without the reflection frequency of light emitted at the half-value angle, i.e., sixty degrees, exceeding seven times.

Embodiment 4

Figure 10B:
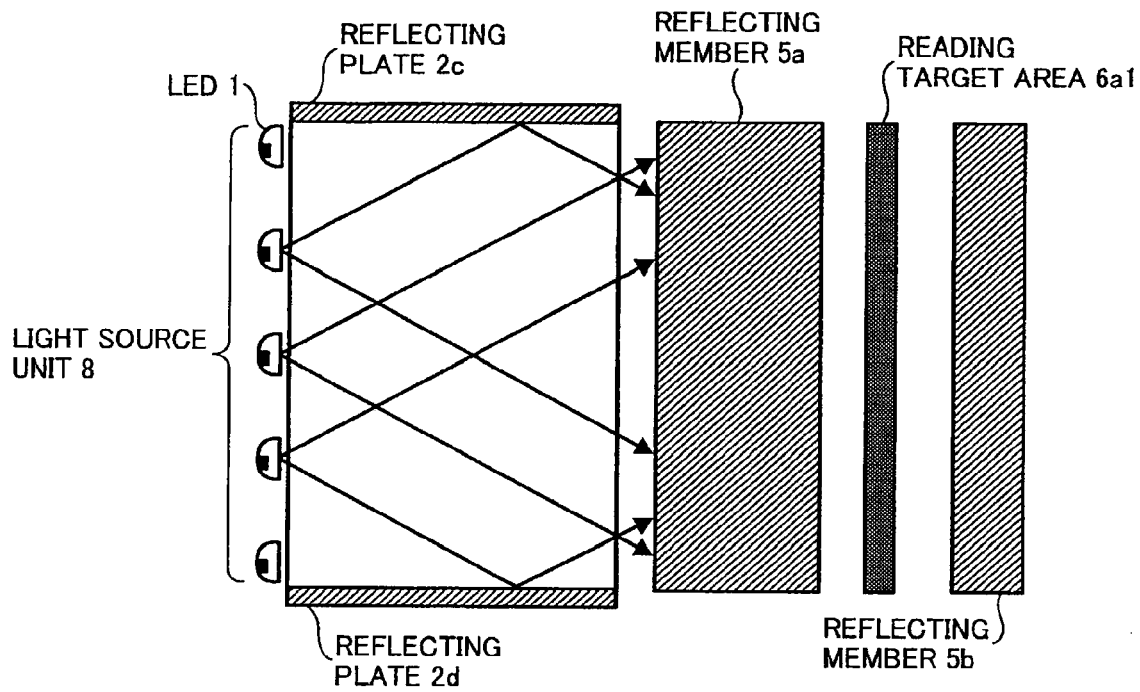
FIG. 10B is a top cross-sectional view illustrating the main part of the image reading device according to the fourth embodiment of the present invention.

In the fourth embodiment, to improve the light use efficiency, the constitutions of the LED 1 or the LEDs 1 and the light guide device 2, and the arrangement of the reflecting members are similar to those in the first embodiment (similar constitution as illustrated in FIG. 5), and as illustrated in FIG. 10, reflecting members 5a and 5b, at least one of which has a curved reflecting surface (a concave surface), instead of the flat reflecting surfaces of the reflecting members 3 and 4, are used. Two curved reflecting members are used in FIG. 10, although the improvement of illuminance of the reading target area 6a1 (improvement of the light use efficiency) can be achieved with only one curved reflecting member.

Figure 11:
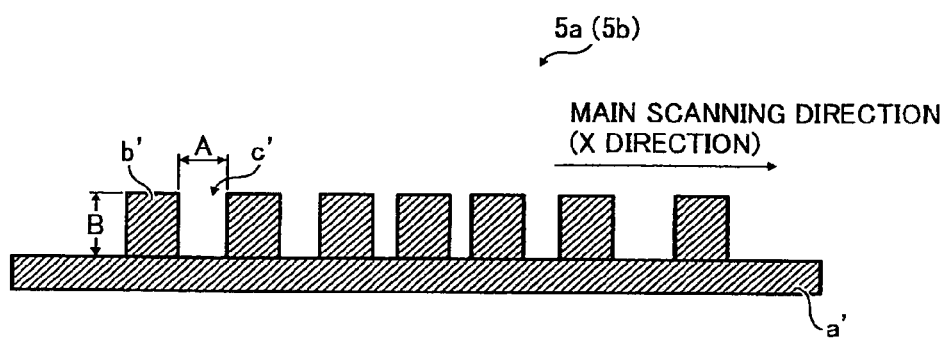
FIG. 11 is a sectional view illustrating a relief structure formed on a reflecting surface of a reflecting member illustrated in FIGS. 10A and 10B according to the fourth embodiment of the present invention.

In addition, each of the reflecting members 5a and 5b has a relief structure in a rectangular shape similar to those on the reflecting members 3 and 4 in the first embodiment. However, as illustrated in FIG. 11, pitches of rectangular asperities are nonuniform, differing to the case in the first embodiment. In particular, a width A of a concave portion c' (an interval between adjacent convex portions b') decreases as the concave portion c' becomes near a center of a main-scanning direction (the X direction) of the reflecting member 5a (or the reflecting member 5b), and increases as the concave portion c' becomes near an end of the reflecting member 5a (or the reflecting member 5b). Such a structure is effective in such a case, i.e., when an arrangement interval between the LEDs 1, for example, decreases gradually from a center to a periphery of a space where the LEDs 1 are disposed, and a uniform illuminance in a center more than that in a periphery of the reading target area 6a1 is necessary.

Embodiment 5

In the fifth embodiment, the constitutions of the LED 1 or the LEDs 1, the light guide device 2, and the reflecting members 5a and 5b are similar to those in the fourth embodiment (similar constitution as illustrated in FIG. 10), and on at least one of the reflecting surfaces of the reflecting plates 2a, 2b, 2c and 2d of the light guide device 2, a relief structure in a rectangular shape similar to FIG. 6 is provided. Due to the relief structure or a rough structure in a grain shape being provided on the at least one of the reflecting surfaces of the reflecting plates 2a, 2b, 2c and 2d of the light guide device 2, uneven illuminance of illumination light can be improved further, which it is preferable.

Although in the above-mentioned embodiments, examples where the relief structure is provided on at least one of the reflecting surfaces of the reflecting members 3 and 4 (or 5a and 5b) are explained, the relief structure can be provided on at least one of the reflecting surfaces of the reflecting plates 2a, 2b, 2c and 2d of the light guide device 2, without providing the relief structure on the reflecting surfaces of the reflecting member 3 and 4 (or 5a and 5b).

Next, a constitution of an image forming device 100 according to the present invention will be explained.

Figure 12:
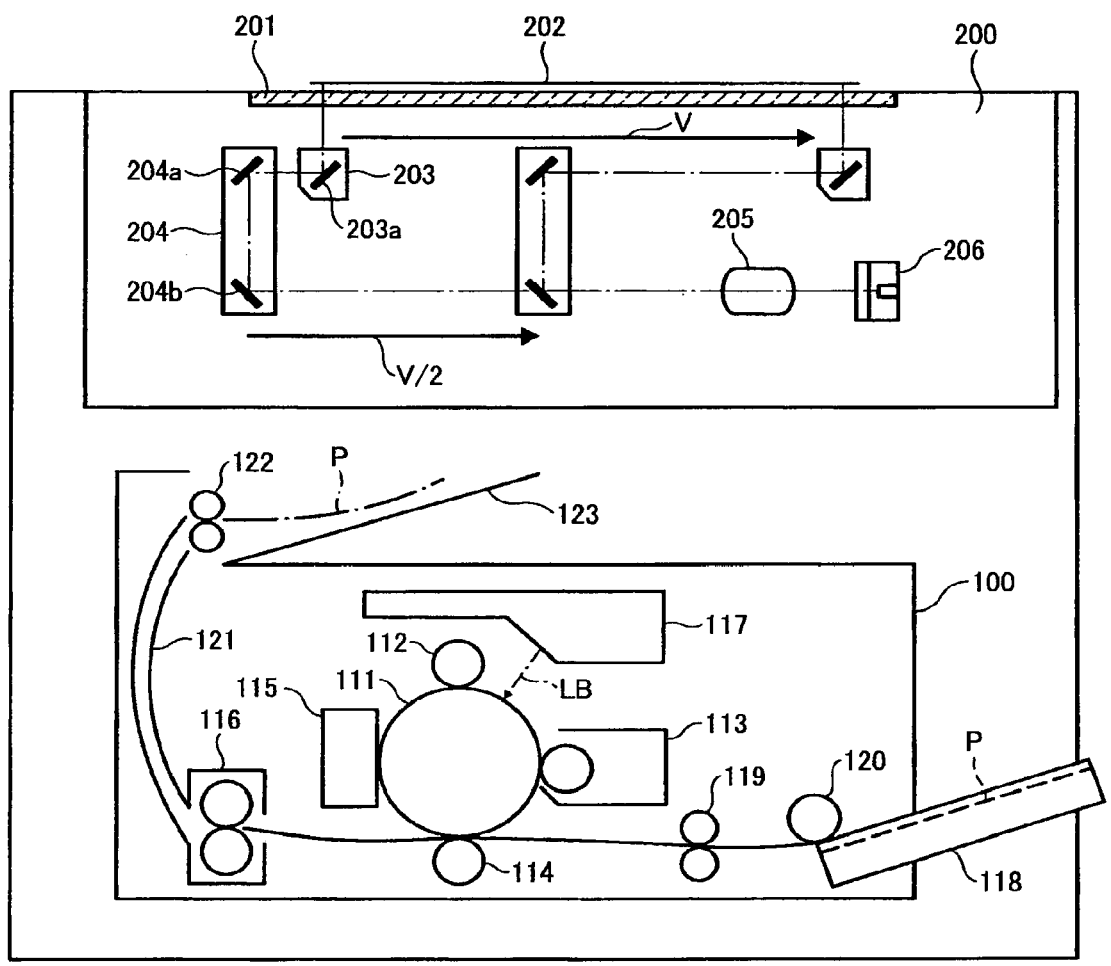
FIG. 12 is a schematic view illustrating a constitution of an image forming device according to the present invention.

FIG. 12 is a schematic view illustrating the image forming device 100 having an image reading device 200 according to the present invention.

In the image reading device 200, a manuscript (an illuminated object) 202 is disposed on a contact glass 201 (the contact glass 6 in FIG. 5A), i.e. a manuscript surface, and an illuminating section not shown, having a constitution according any one of the first to the fifth embodiments, which is provided at a first traveling body 203 arranged under the contact glass 201, illuminates the manuscript 202. Reflected light from the manuscript 202 is reflected by a first mirror 203a of the first traveling body 203, and then is reflected by a first mirror 204a and a second mirror 204b of a second traveling body 204, and then is led to an imaging lens 205, and is imaged on a line sensor 206. In addition, the present invention can be applied to a color image reading device by providing the line sensors 206 corresponding to each color of RGB, with a similar constitution.

When scanning in the length direction of the manuscript, the first traveling body 203 moves to the right in FIG. 12 at a speed of V, and at the same time the second traveling body 204 moves to right at a speed of ½V, which is a half of the speed of the first traveling body 203; therefore an optical path length from the manuscript 202 to the line sensor 206 is kept constant, and the entire manuscript can be read out at a constant magnification.

The image forming device 100 includes a latent image carrier 111 in a drum shape, a charge roller 112 as a charging device, and a developing device 113, and a transfer roller 114 and a cleaning device 115 are arranged in the surroundings of the latent image carrier 111. A corona charger can be used as the charging device. In addition, an optical scanning device 117 which receives manuscript information from outside such as an image reading part and performs optical scanning by laser beam LB is provided, and "exposure by the laser beam" LB is performed between the charge roller 112 and the developing device 113.

When forming an image, the latent image carrier 111, which is a photoconductive photoreceptor, is rotated clockwise at a constant speed, and a surface of the latent image carrier 111 is uniformly charged by the charge roller 112, and receives the exposure by the optical writing of the laser beam LB of the optical scanning device 117, and an electrostatic latent image is formed. The formed electrostatic latent image includes a so-called negative latent image where an image area is exposed and a so-called positive latent image where a non-image area is exposed. Any one of the above-mentioned electrostatic latent images is visible by using a toner for the electrostatic latent image development in the developing device 113. Hereat, four developing devices 113 are provided each of which corresponds to each of four colors of YMCK; therefore the image forming device can form a color image.

A cassette 118 storing transfer paper P is provided detachably to a main body of the image forming device 100. In a state that the cassette 118 is attached to the image forming device 100, as illustrated in FIG. 12, one piece of transfer paper on the top of the stored transfer paper P is fed by a paper feeding collar 120, and an end of the fed one piece of transfer paper P is caught by a pair of resist rollers 119. The pair of resist rollers 119 feed the one piece of transfer paper P to a transfer part, synchronously with a timing of moving a toner image on the latent image carrier 111 to a transfer position. The fed one piece of transfer paper P is superimposed with the toner image in the transfer part and the toner image is an electrostatic image transferred by an action of the transfer roller 114. The one piece of transfer paper P transferred with the toner image is sent to a fixing device 116, and the toner image is fixed in the fixing device 116, and then is ejected onto a catch tray 123 by a pair of delivery rollers 122, passing through a feeding path 121. The surface of the latent image carrier 111 after transferring of the toner image is cleaned by the cleaning device 115, and residual toner and paper dust or the like are removed.

According to an aspect of the present invention, it can provide an image reading device having a compact illumination optical system in which the number of light sources is small and illuminance unevenness is little. In addition, it can provide an image forming device which is capable of forming a good image while being compact, by using the image reading device.

It should be noted that although the present invention has been described with respect to exemplary embodiments, the invention is not limited thereto. In view of the foregoing, it is intended that the present invention cover modifications and variations provided they fall within the scope of the following claims and their equivalent.

The entire contents of Japanese patent application No. JP 2007-228756, filed on Sep. 4, 2007, of which the convention priority is claimed in this application, are incorporated hereinto by reference.

What is claimed is:

1. An illumination device which illuminates a manuscript surface, comprising:
   a light source unit having a plurality of LED light sources arranged in a predetermined direction; and
   a plurality of reflecting surfaces, which reflect light emitted from the light source unit, and guide the light to the manuscript surface, wherein
   a reflection region which reflects light vertically emitted from light emitting surfaces of the LED light sources includes a relief structure which changes a traveling direction of incident light in an arrangement direction of the plurality of LED light sources,
   wherein at least two reflecting surfaces of the plurality of reflecting surfaces are arranged to be faced to each other and to sandwich the light source unit from a direction vertical to the manuscript surface, and
   wherein the two reflecting surfaces are arranged such that a length of the two reflecting surfaces in a traveling direction of the light vertically emitted from the light emitting surfaces of the LED light sources is longer than a distance between the two reflecting surfaces in the direction vertical to the manuscript surface.

2. The illumination device according to claim 1, wherein the reflection region is provided in one of the plurality of reflection surfaces.

3. The illumination device according to claim 1, wherein two reflecting surfaces of the plurality of reflecting surfaces face each other, and the facing reflecting surfaces are disposed such that a distance on an emission side is longer than a distance on an incident side.

4. The illumination device according to claim 3, wherein each of the facing reflecting surfaces includes one plane.

5. The illumination device according to claim 1, wherein the relief structure includes a one-dimensional grating in which a plurality of grooves are formed on a substrate in parallel.

6. The illumination device according to claim 5, wherein the relief structure includes a diffracting grating structure.

7. The illumination device according to claim 5, wherein the plurality of grooves of the relief structure are arranged such that a length direction of each of the plurality of grooves is perpendicular to a length direction of a reading target area.

8. The illumination device according to claim 5, wherein a ratio (B/A) of a height B of a convex portion to a width A of a concave portion of the relief structure is 0.692 or more than 0.692.

9. The illumination device according to claim 5, wherein a cross-section shape of the convex portion of the relief structure includes any one of a rectangular shape, a triangular shape or a trapezoidal shape.

10. The illumination device according to claim 1, wherein the relief structure includes a structure of a random grain shape.

11. The illumination device according to claim 1, wherein a reflecting surface of at least one of the plurality of reflecting members includes a curved area.

12. The illumination device according to claim 1, wherein at least one reflecting surface is provided with an aluminum coating.

13. The illumination device according to claim 1, wherein at least one reflecting surface is provided with a reflective sheet.

14. The illumination device according to claim 1, wherein the LED light sources include a single-chip type white light-emitting diode using a fluorescent material.

15. The illumination device according to claim 1, wherein the LED light sources include a white light emitting-diode which consists of at least two kinds of chips of a light-emitting diode each of which emits a different color of light and which emits white light by the color mixture.

16. An image reading device, comprising:
the illumination device according to claim 1;
an imaging optical system which images light reflected from the manuscript surface; and
a sensor provided in an imaging section of the imaging optical system, which reads an image of the manuscript.

17. An image forming device comprising the image reading device according to claim 16.

18. The illumination device according to claim 1, wherein the distance between the two reflecting surfaces in the direction vertical to the manuscript surface increases with distance from the light source unit.

* * * * *